(12) United States Patent
Skaar

(10) Patent No.: US 6,385,001 B1
(45) Date of Patent: May 7, 2002

(54) MEDIA IDENTIFICATION FOR MAGNETIC TAPE DRIVE

(75) Inventor: Leif Skaar, Denver, CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/263,833

(22) Filed: Mar. 8, 1999

(51) Int. Cl.[7] ............................................. G11B 19/02
(52) U.S. Cl. ............................................ 360/69; 360/48
(58) Field of Search .............................. 360/128, 137, 360/69, 25, 48

(56) References Cited

U.S. PATENT DOCUMENTS

| | | | |
|---|---|---|---|
| 4,422,119 A | 12/1983 | Kawakami et al. | 360/128 |
| 4,644,433 A | 2/1987 | Horikawa et al. | 360/132 |
| 4,893,209 A | 1/1990 | Siddiq | 360/128 |
| 4,901,171 A | 2/1990 | Urayama et al. | 360/74.6 |
| 5,024,394 A | 6/1991 | Ozawa et al. | 242/198 |
| 5,075,810 A | 12/1991 | Iwahashi | 360/132 |
| 5,369,285 A | 11/1994 | Georgis et al. | 250/561 |
| 5,612,827 A | * 3/1997 | Morita | 360/25 |
| 5,638,236 A | 6/1997 | Scott | 360/128 |

FOREIGN PATENT DOCUMENTS

| | | | |
|---|---|---|---|
| DE | 31 13390 | * | 10/1982 |
| JP | 51-95812 | | 8/1976 |
| JP | 62-18835 U | | 2/1987 |
| JP | 8-90876 A | | 4/1996 |

* cited by examiner

*Primary Examiner*—Andrew L. Sniezek
(74) *Attorney, Agent, or Firm*—Nixon & Vanderhye, P.C.

(57) ABSTRACT

Media (31) for use in a magnetic tape drive (30) has a magnetic recording/reproducing segment (3106) for magnetically transducing information; a cleaning segment (3104); and, an identification window segment (3108). The identification window segment is situated intermediate the magnetic recording/reproducing segment and the cleaning segment, and has an electromagnetic transmissiveness which differs from the magnetic recording/reproducing segment and the cleaning segment. Preferably, the identification window segment is transparent to a predetermined wavelength range (e.g., infrared) while the magnetic recording/reproducing segment and the cleaning segment are opaque to the same predetermined wavelength range. The identification window segment has a dimension (e.g., length L) chosen to provide a predetermined media or cartridge signature when the media is transported at a selected linear velocity.

36 Claims, 3 Drawing Sheets

US 6,385,001 B1

MEDIA IDENTIFICATION FOR MAGNETIC TAPE DRIVE

BACKGROUND

1. Field of the Invention

The present invention pertains to magnetic tape which is used for transducing information, and particularly to identification of magnetic tape cartridges.

2. Related Art and Other Considerations

For decades information has been stored on magnetic tape medium using tape drives. Initially the magnetic tapes were wound about large reels in similar manner as film for early film projectors. In more recent years the magnetic tape has typically been housed in a cartridge or cassette, extending internally in the cartridge from a supply reel to a take-up reel. In some systems, the magnetic tape has longitudinal tracks recorded thereon (e.g., tracks that extend along the major length dimension of the tape). In other systems, the path of the magnetic tape is such that the tape is at least partially wrapped around a drum in a manner to transduce helical stripes or tracks on the magnetic tape. Some of the cartridges have a lid or the like which is displaced upon insertion of the cartridge into the tape drive, thereby exposing the magnetic tape to operative elements of the tape drive (e.g., tape guides, tape transport mechanisms, and transducing elements). Other cartridges are fabricated with a window or the like into which operative elements of the tape drive extend when the cartridge is loaded into the tape drive.

Some magnetic tape/cartridge manufacturers have developed techniques whereby, upon insertion into a tape drive, the tape/cartridge is identified as being of a certain type. For example, Minnesota Mining and Manufacturing Company (3M) has developed a pattern of holes formed in a tape which are optically detected as an indication that the tape is a quarter inch cartridge (QIC) tape. Similarly, Sony Corporation has a DDS pattern for 4 millimeter digital audio tape (DAT) identification, and a RS pattern for 8 millimeter MP identification (MP refers to metal particle coating type tape).

Debris and dust can collect internally in tape drives and eventually on magnetic tape itself. The presence of such debris or dust on the tranducing element(s), either by contact with the tape or otherwise, can lead to degredation of signal quality and thus decreased performance of the transducing element(s) and the tape drive overall. To counteract the problem of debris or dust aggregating on the tranducing element(s), typically periodically a cleaning cartridge is loaded into the tape drive. The cleaning cartridge resembles a tape cartridge in most aspects, but the media extending from the supply reel to the take-up reel is a cleaning material rather than magnetic tape. The cleaning material comprising the media is transported past the tranducing element(s) in a manner to wipe gently the tranducing element(s), thereby removing dust and debris. U.S. Pat. No. 5,369,285 to Georgis provides optical detection of cleaning medium in an information storage drive.

It has been know to combine both magnetic tape and some the of cleaning material on the same media. For example, U.S. Pat. No. 4,422,119 to Kawakami et al. forms at least part of a leader for magnetic tape with an abrasive cleaning material. U.S. Pat. No. 5,638,236 to Scott discloses tape having a first (preferably magnetic) portion with a cleaning leader directly spliced thereto. U.S. Pat. No. 4,893,209 to Siddiq provides multifunction cleaning tape that also has a segment for providing diagnositic/instructional information to a user.

What is needed, and an object of the present invention, is a magnetic tape that provides both cleaning and self-identifying capabilities.

BRIEF SUMMARY OF THE INVENTION

Media for use in a magnetic tape drive has a magnetic recording/reproducing segment for magnetically transducing information; a cleaning segment; and, an identification window segment. The identification window segment is situated intermediate the magnetic recording/reproducing segment and the cleaning segment, and has an electromagnetic transmissiveness which differs from the magnetic recording/reproducing segment and the cleaning segment. Preferably, the identification window segment is transparent to a predetermined wavelength range (e.g., infrared) while the magnetic recording/reproducing segment and the cleaning segment are opaque to the same predetermined wavelength range. The identification window segment has a dimension (e.g., length) chosen to provide a predetermined media or cartridge signature when the media is transported at a selected linear velocity.

Upon insertion into a magnetic tape drive, the magnetic tape is transported past a detector assembly which directs a beam of electromagnetic radiation through the tape. Whereas the cleaning segment and magnetic recording/reproduction segment do not transmit the beam therethrough, the identification window segment does. Transport of the identification window segment past the detector assembly thus results in generation of a signal having a pulse width related to the length of identification window segment. The signal is received at a processor, which uses the signal to determine the type of the tape/cartridge and optionally to operate the tape drive in accordance with the thusly discerned type.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
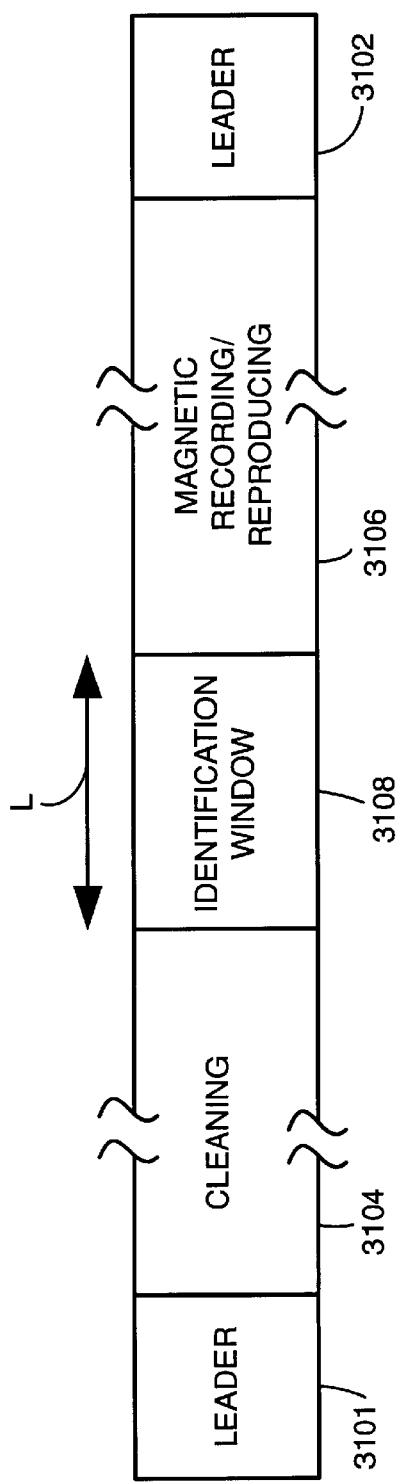
FIG. 1 is a diagrammatic top view of format of a media according to an embodiment of the present invention.

FIG. 1 illustrates an embodiment of magnetic media, i.e., magnetic tape 31, according to an embodiment of the present invention. At extreme ends thereof, magnetic tape 31 has leader portions 3101 and 3102. When magnetic tape 31 is housed in a cartridge, the leader portions 3101 and 3102 are typically respectively secured to supply and take-up reels of the cartridge. Adjacent leader 3101 is a cleaning segment 3104 of magnetic tape 31. The cleaning segment 3104 has a constituency which, when in contact with a transducing element or head of a tape drive, tends to remove debris or dust from the head. The magnetic tape 31 also has a magnetic recording/reproduction segment 3106 on which information is magnetically transduced by the head(s). In the illustrated embodiment, the information is transduced in helical stripes in magnetic recording/reproduction segment 3106.

Spliced between cleaning segment 3104 and magnetic recording/reproduction segment 3106 is identification window segment 3108. The identification window segment 3108 has an electromagnetic transmissiveness which differs from the magnetic recording/reproducing segment 3016 and the cleaning segment 3104. In the illustrated preferred embodiment, the identification window segment 3108 is transparent to a predetermined wavelength range (e.g., infrared energy) while the magnetic recording/reproducing segment and the cleaning segment are opaque to the same predetermined wavelength range.

Identification window segment 3018 has a dimension chosen to provide a predetermined media or cartridge signature when the media is transported at a selected linear velocity. The dimension is the length dimension L (see FIG. 1), i.e., the dimension in the direction of tape transport. This signature can be used to distinguish between characteristics of different tapes and/or cartridges, such as (for example) tape length, tape thickness, cartridge intended applications, and so forth.

In one embodiment, the cleaning segment 3104 is about two meters long. Whereas a butt joint is typically formed by the splicing of magnetic tape to a leader or to a cleaning segment, in the present invention the identification window segment 3108 is spliced between cleaning segment 3104 and magnetic recording/reproduction segment 3106. In the present invention, an identification window splice of length L is formed. The length L of identification window segment 3108 can be varied to provide different tape/cartridge signatures. As explained hereinafter, when used in conjunction with a detector (e.g., optical detector), a unique pulse is generated in relation to the length L as the identification window segment 3108 is transported past the detector. The length L can be set differently for different tapes/cartridges in order to signify selected characteristics of the tape/cartridge.

Figure 1A:
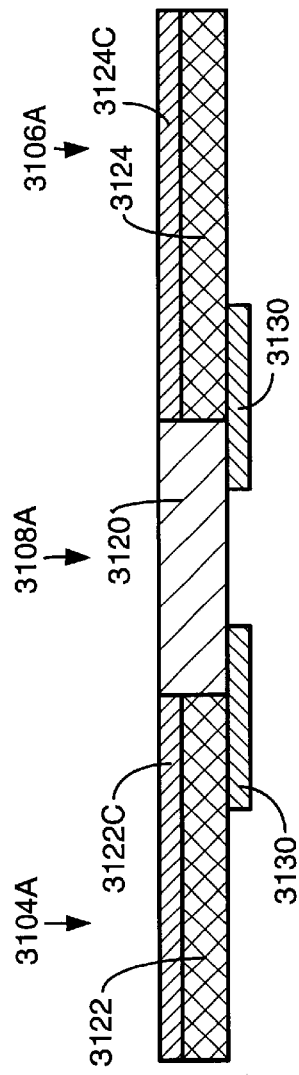
FIG. 1A is a diagrammatic cross sectional side view of the media of FIG. 1 showing a first mode of fabrication thereof.
Figure 1B:
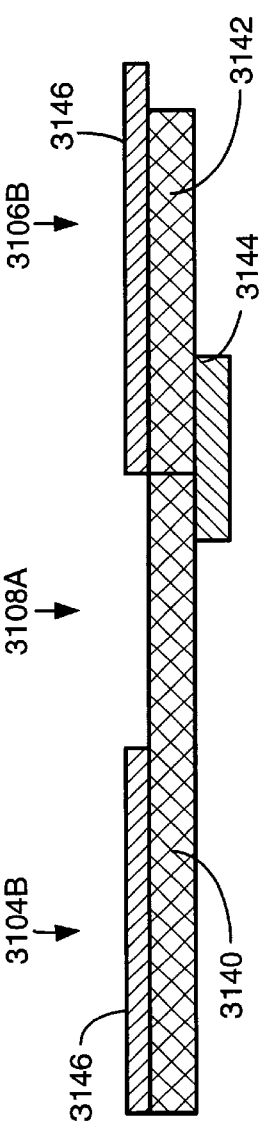
FIG. 1B is a diagrammatic cross sectional side view of the media of FIG. 1 showing a second mode of fabrication thereof.

The tape 31 with identification window segment 3108 can be fabricated in various ways, two of which are illustrated in FIG. 1A and FIG. 1B. In the mode FIG. 1A, identification window segment 3108A is formed by splicing a third piece of tape (a transparent window tape 3120) between two other pieces of tape, i.e., pieces 3122 and 3124. Unlike transparent window tape 3120, both pieces 3122 and 3124 have relative opaque coatings 3122C and 3124C, respectively. The pieces 3122 and 3124 thus respectively form the cleaning segment 3104A and the magnetic recording/reproducing segment 3106A. Splicing tapes 3130 bridge the butt joints beneath transparent window tape 3120 and piece 3122 on the one side of piece 3120 and beneath transparent window tape 3120 and piece 3124 on the other side of piece 3120.

In the mode of FIG. 1B, two pieces of tape 3140 and 3142 are joined at a butt joint by splicing tape 3144. The identification window segment 3108B is formed by removing coating 3146 from either piece 3140 or piece 3142 for a length L. It should be understood that conversely the coating could instead be removed over the portion of tape piece 3142 at the butt joint with tape piece 3140.

Thus, as illustrated by FIG. 1A and FIG. 1B, the identification window 3108 can be made by splicing in a segment of transmissive polymeric material between two other tapes (see FIG. 3A) or provided in an uncoated (or coating removed) segment (such as occurs that the juncture of two tape pieces as shown in FIG. 1B).

Figure 2:
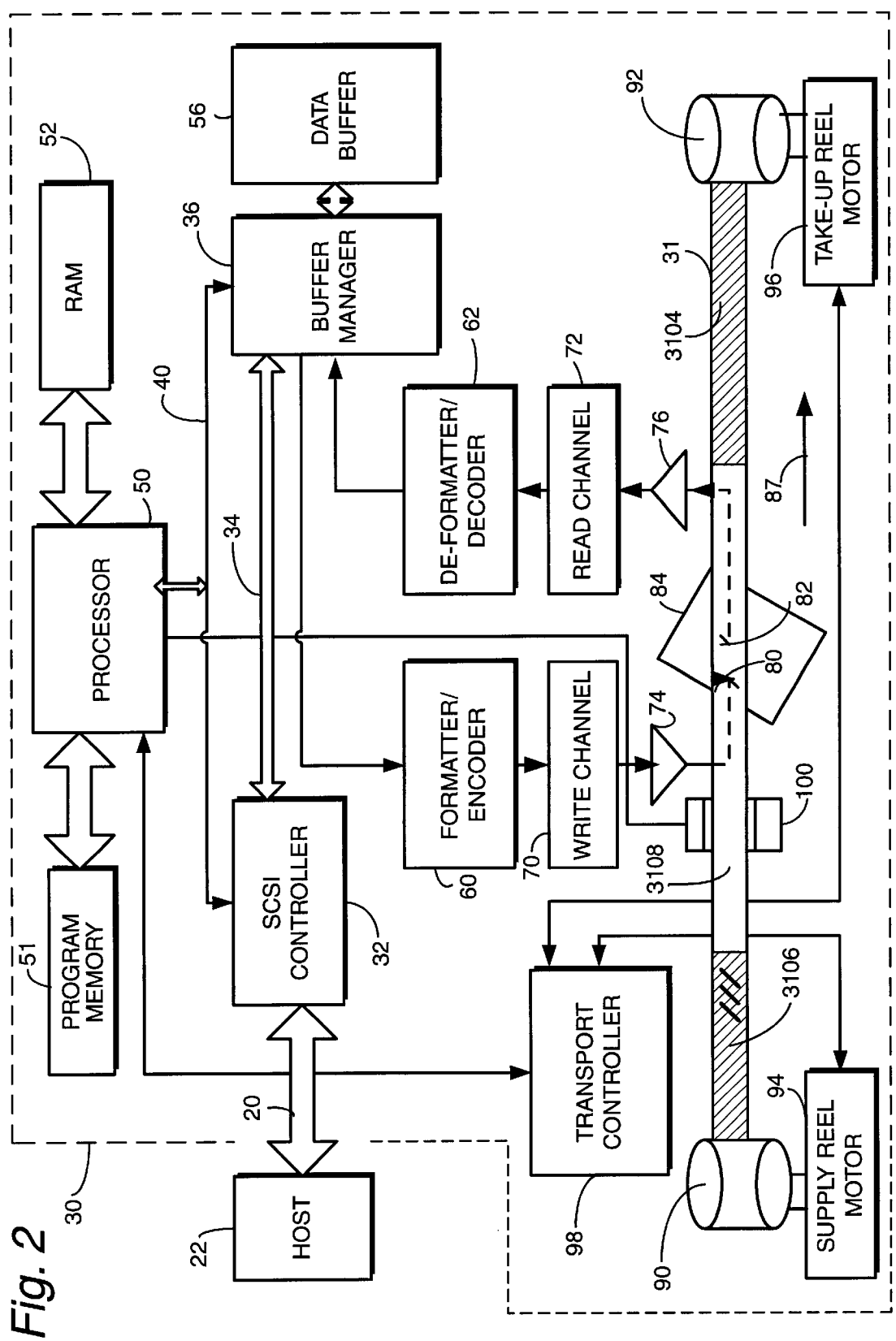
FIG. 2 is a schematic view of a tape drive which utilizes the media of FIG. 1.

FIG. 2 depicts an illustrative tape drive 30 in which the tape 31 of the present invention can be employed. While the particular tape drive 30 shown in FIG. 2 and discussed herein is a helical scan tape drive, it will be appreciated that the media of the present invention is useable with, and that the invention also concerns, other types of tape drives such as longitudinal or serpentine tape drives.

FIG. 2 shows a SCSI bus 20 which connects a host computer 22 and a first embodiment of a SCSI target storage device, particularly tape drive 30. In the illustrated embodiment, tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to formatter/encoder 60 and to deformatter/decoder 62. Formatter/encoder 60 and deformatter/decoder 62 are, in turn, respectively connected to write channel 70 and read channel 72. Write channel 70 is connected via write amplifier 74 to one or more recording element(s) or write head(s) 80; read channel is connected via read amplifier 76 to one or more read element(s) or read head(s) 82.

Those skilled in the art will appreciate that write channel 70 includes various circuits and elements including a RLL modulator, a parallel-to-serial converter, and write current modulator. Similarly, the person skilled in the art understands that read channel 72 includes a data pattern and clock recovery circuitry, a serial-to-parallel converter, and, an RLL demodulator. These and other aspects of tape drive 30, including servoing, error correction, are not necessary for an understanding of the invention and accordingly are not specifically described herein.

Write head(s) 80 and read head(s) 82 are situated on a peripheral surface of rotating drum 84. Tape 31 is wrapped around drum 84 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around drum 84.

The present invention is useful not only with numerous types of tape drives, but even numerous types of tape drives within the helical scan family. For example, in one type of tape drive, tape 31 is transported by an unillustrated capstan which is rotated by a capstan motor. The drum has one write head and one read head, mounted 180 degrees apart on the periphery of the drum. In this type of tape drive, the capstan motor is controlled by transport controller 98, which ultimately is governed by processor 50. An example of this first type of tape drive is the EXB-8200 model tape drive manufactured by Exabyte Corporation, and which is illustrated e.g., in U.S. Pat. Nos. 4,843,495; 4,845,577; and 5,050,018, all of which are incorporated herein by reference.

A second type of tape drive with which the invention is useful is the MammothJ tape drive manufactured by Exabyte Corporation, and which is illustrated e.g., in U.S. Pat. No. 5,602,694, incorporated herein by reference. In this second type of type drive, two write heads and two read heads are mounted on the drum. A supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. patent application Ser. No. 08/337,620 for METHOD AND APPARATUS FOR CONTROLLING MEDIA LINEAR SPEED IN A HELICAL SCAN RECORDER, filed Nov. 10, 1994 and incorporated herein by reference.

In accordance with the present invention, as shown in FIG. 2 tape drive 30 also includes a detector assembly 100. The detector assembly 100 is positioned to direct a ray or beam of electromagnetic energy through magnetic tape 31. In this regard, detector assembly 100 includes an emitter (e.g., diode) positioned on one side of magnetic tape 31, and a detector positioned on an opposite side of magnetic tape 31 as shown in FIG. 2. The emitter emits electromagnetic energy of a predetermined wavelength (e.g., infrared). The electromagnetic energy emitted by the emitter is not transmitted through cleaning segment 3104 and magnetic recording/reproduction segment 3106, but is transmitted through identification window segment 3108 when the identification window segment 3108 is transported past the fixed location of detector assembly 100.

Thus, as magnetic tape 31 is transported in the tape path of tape drive 30, any movement of identification window segment 3108 past detector assembly 100 will permit the beam of the emitted light to be incident on the detector of detector assembly 100, resulting in a voltage response which is proportional to the amount of energy incident on the detector. The detector then generates a signal or pulse having a pulse width W related to the effective length L of identification window segment 3108 and the velocity of tape transport. In fact, the pulse width W is inversely proportional to the velocity of tape linear transport and proportional to the effective length L of identification window segment 3108.

The signal generated by detector assembly 100 is conditioned if necessary and applied to processor 50 (see FIG. 2). The processor 50 is programmed or otherwise preset to compare the signal, and thus the signature of the tape or cartridge, to one or more stored templates or stored signature values. These stored templates or stored signature values can be stored in a register of processor 50, or in RAM 52, for example. Upon matching of the signal (signature) from detector assembly 100 with a known one of the stored templates or signature values, the processor 50 can ascertain the identity or type of tape/cartridge which has been loaded into tape drive 30.

Figure 3:
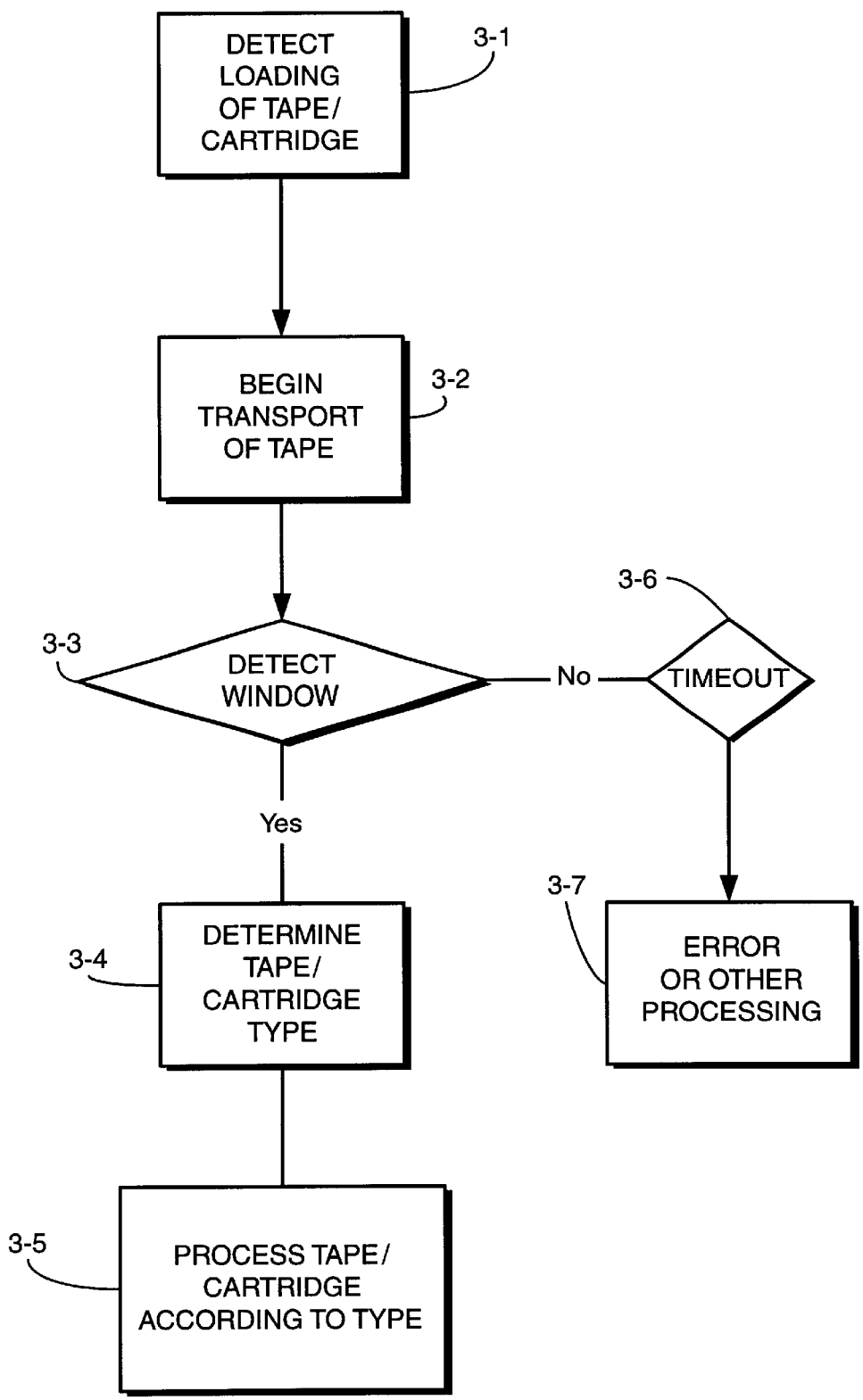
FIG. 3 is a flowchart showing basic steps performed by the tape drive of FIG. 2 when utilizing the media of FIG. 1.

FIG. 3 shows basic steps involved in usage of the magnetic tape 31 of the present invention. At step 3-1, the tape drive 30 detects loading of the cartridge with magnetic tape 31 into tape drive 30 in conventional manner. Thereafter, at step 3-2, the magnetic tape 31 is transported in the direction of arrow 87 under control of transport controller 98. In one embodiment of tape drive 30 discussed above, take-up motor 96 (and optionally supply motor 94) are involved in transporting magnetic tape 31. As magnetic tape 31 is being transported, at step 3-3 processor 50 together with detector assembly 100 attempts to detect identification window segment 3108. In this regard, processor 50 commands detector assembly 100 to emit its radiant beam toward magnetic tape 31. As long as the cleaning segment 3104 is in the tape path at the point between the emitter and detector of 100, the radiant beam is blocked by the essentially opaque nature of cleaning segment 3104. However, when identification window segment 3108 passes the point of detector assembly 100 in the tape path at the time shown in FIG. 2, the detector assembly 100 outputs it signal of pulse W to processor 50. Upon detecting the signal from detector assembly 100 at step 3-3, at step 3-4 processor 50 knows that the identification window segment 3108 has been encountered. Then, using the pulse width W received from detector assembly 100, at step 3-4 the processor 50 endeavors to determine the identity of the magnetic tape 31. For example, at step 3-4 the processor 50 can use a look up table or the like to compare the pulse width W of the signal from detector assembly 100 with stored templates or values to determine the tape or cartridge type. Thereafter, knowing the tape or cartridge type, processor 50 can process the magnetic tape 31 in accordance with its now know type.

For example, upon receiving a signal from detector assembly 100 indicative of the fact that the tape includes both cleaning segment 3104 and magnetic recording/reproduction segment 3106, the processor 50 can (if desired) capitalized upon the presence of the cleaning segment 3104 of the tape and perform a cleaning operation to clean heads 80, 82, etc.

If the processor 50 has not detected the identification window segment 3108 at step 3-3 within a predetermined time out period (as shown by step 3-6), the processor 50 can provide either an error message or some alternate processing that is not dependent upon knowledge of cartridge/tape type.

The currently preferred range for L is from 0.3 cm to 10 cm, and currently is more preferably 2.7 cm for identifying a cartridge suitable for use with a second version of the Exabyte® Mammoth™ tape drive.

The identification window segment 3108 thus becomes the signature of the tape or cartridge. This signature can be used to distinguish between various characteristics, e.g., tape length, tape type, tape thickness, and cartridge intended application, for example. The number of unique signatures is limited only by the length L of identification window segment 3108 and the ability of tape drive 30 to resolve a specific length. Manufacturing tolerances and the ability of detector assembly 100 (together with processor 50) to resolve time differences influence the ability to resolve differences in the value of L for identification window segment 3108. Advantageously, this resolution is an improvement over prior art techniques of attempting to recognized a number of holes punched in a tape, or printed lines on a tape, or metalized patterns or holes in a cartridge housing.

The identification window segment 3108 also becomes a point of demarcation between cleaning segment 3104 and magnetic recording/reproduction segment 3106. For instance, placing the identification window segment 3108 between cleaning segment 3104 and magnetic recording/reproduction segment 3106 performs at least two functions. A first function is identifying the tape/cartridge according to type, e.g., for example a type that has both a cleaning component and a magnetic recording/reproduction component. A second function is marking the beginning or end of a section within the cartridge and thereby creates a load point for the cartridge. In this regard, the identification window segment 3108 can be used at either the end of tape or the beginning of tape ends of a length of media.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Media for use in a magnetic tape drive, the media having:
    a magnetic recording/reproducing segment for magnetically transducing information;
    a cleaning segment comprised of material suitable for cleaning a transducing element of a tape drive;
    an identification window segment for identifying a type of the media, the identification window segment being located between the magnetic recording/reproducing segment and the cleaning segment, the identification window segment having an electromagnetic transmissiveness which differs from the magnetic recording/reproducing segment and the cleaning segment, wherein the identification window segment has a length chosen to provide a predetermined media or cartridge signature when the media is transported at a selected linear velocity.

2. The media of claim 1, wherein the identification window segment is transparent to a predetermined wavelength range while the magnetic recording/reproducing segment and the cleaning segment are opaque to the predetermined wavelength range.

3. The media of claim 2, wherein the identification window segment is transparent to infrared radiation.

4. The media of claim 1, wherein the magnetic recording/reproducing segment has identification transduced in helical stripes.

5. Media for use in a magnetic tape drive, the media having:
    a magnetic recording/reproducing segment for magnetically transducing information;
    a cleaning segment comprised of material suitable for cleaning a transducing element of a tape drive;
    an identification window segment for identifying a type of the media, the identification window segment being located between the magnetic recording/reproducing segment and the cleaning segment, the identification window segment having a dimension chosen to provide a predetermined media or cartridge signature when the media is transported at a selected linear velocity.

6. The media of claim 5, wherein the identification window segment has an electromagnetic transmissiveness which differs from the magnetic recording/reproducing segment and the cleaning segment.

7. The media of claim 6, wherein the identification window segment is transparent to a predetermined wavelength range while the magnetic recording/reproducing segment and the cleaning segment are opaque to the predetermined wavelength range.

8. The media of claim 7, wherein the identification window segment is transparent to infrared radiation.

9. The media of claim 5, wherein the magnetic recording/reproducing segment has identification transduced in helical stripes.

10. A magnetic tape drive comprising:
    a transducing element which transduces information relative to media loaded into the drive;
    a media transport for transporting the media proximate the transducing element and for imparting a linear velocity to the media;
    a processor which, upon loading of the media into the tape drive, detects an identification window segment of the media located between a magnetic recording/reproducing segment of the media and a cleaning segment of the media, the identification window segment having an electromagnetic transmissiveness which differs from the magnetic recording/reproducing segment and the cleaning segment, and the processor identifying a type of the media using the detected identification window segment of the media.

11. The apparatus of claim 10, further comprising a electromagnetic transmissiveness sensor which detects the electromagnetic transmissiveness of the identification window segment and generates a signal related thereto for application to the processor.

12. The apparatus of claim 11, wherein the signal generated by the electromagnetic transmissiveness sensor has a pulse related to a length of the identification window segment.

13. The apparatus of claim 10, wherein the identification window segment is transparent to a predetermined wavelength range while the magnetic recording/reproducing segment and the cleaning segment are opaque to the predetermined wavelength range.

14. The apparatus of claim 13, wherein the identification window segment is transparent to infrared radiation.

15. The apparatus of claim 10, wherein the tape drive is a helical scan tape drive.

16. A magnetic tape drive comprising:
    a transducing element which transduces information relative to media loaded into the drive;
    a media transport for transporting the media proximate the transducing element and for imparting a linear velocity to the media;
    a processor which, upon loading of the media into the tape drive, detects an identification window segment of the media located between a magnetic recording/reproducing segment of the media and a cleaning segment of the media, the identification window segment having a dimension chosen to provide a predetermined media or cartridge signature when the media is transported at a selected linear velocity, and the processor identifying a type of the media using the detected identification window segment of the media.

17. The apparatus of claim 16, wherein the identification window segment has an electromagnetic transmissiveness which differs from the magnetic recording/reproducing segment and the cleaning segment.

18. The apparatus of claim 17 further comprising a electromagnetic transmissiveness sensor which detects the electromagnetic transmissiveness of the identification window segment and generates a signal related thereto for application to the processor.

19. The apparatus of claim 18, wherein the signal generated by the electromagnetic transmissiveness sensor has a pulse related to a length of the identification window segment.

20. The apparatus of claim 16, wherein the identification window segment is transparent to a predetermined wavelength range while the magnetic recording/reproducing segment and the cleaning segment are opaque to the predetermined wavelength range.

21. The apparatus of claim 20, wherein the identification window segment is transparent to infrared radiation.

22. The apparatus of claim 16, wherein the tape drive is a helical scan tape drive.

23. A method of operating a magnetic tape drive comprising:
    upon loading of the media into the tape drive, transporting media along a tape path;
    detecting an identification window segment of the media located between a magnetic recording/reproducing segment of the media and a cleaning segment of the media, the identification window segment having an electromagnetic transmissiveness which differs from the magnetic recording/reproducing segment and the cleaning segment; identifying a type of the media based on the detected identification window segment of the media.

24. The method of claim 23, further sensing electromagnetic transmissiveness of the identification window segment and generating a signal related thereto.

25. The method of claim 24, wherein the signal generated by the electromagnetic transmissiveness sensor has a pulse related to a length of the identification window segment.

26. The method of claim 23, wherein the identification window segment is transparent to a predetermined wavelength range while the magnetic recording/reproducing segment and the cleaning segment are opaque to the predetermined wavelength range.

27. The method of claim 23, wherein the detecting comprising directing infrared radiation through the identification window segment.

28. The method of claim 23, further comprising transducing helical stripes on the magnetic recording/reproducing segment of the media.

29. A method of operating a magnetic tape drive comprising:
    upon loading of the media into the tape drive, transporting media along a tape path;
    detecting an identification window segment of the media occurring intermediate a magnetic recording/reproducing segment of the media and a cleaning segment of the media, the identification window segment having a dimension chosen to provide a predetermined media or cartridge signature when the media is transported at a selected linear velocity; and identifying a type of the media based on the detected identification window segment of the media.

30. The method of claim 29, further comprising detecting an electromagnetic transmissiveness of the identification window segment which differs from the magnetic recording/reproducing segment and the cleaning segment.

31. The method of claim 30, further sensing electromagnetic transmissiveness of the identification segment and generates a signal related thereto.

32. The method of claim 31, wherein the signal generated by the electromagnetic transmissiveness sensor has a pulse related to a length of the identification window segment.

33. The method of claim 29, further comprising transporting the media at a selected linear velocity to determine a predetermined media or cartridge signature, the identification window segment having a length chosen to provide the predetermined media or cartridge signature when the media is transported at the selected linear velocity.

34. The method of claim 33, wherein the identification window segment is transparent to a predetermined wavelength range while the magnetic recording/reproducing segment and the cleaning segment are opaque to the predetermined wavelength range.

35. The method of claim 34, wherein the detecting comprising directing infrared radiation through the identification window segment.

36. The method of claim 29, further comprising transducing helical stripes on the magnetic recording/reproducing segment of the media.

* * * * *